US012759320B2

(12) United States Patent
Holmes et al.

(10) Patent No.: US 12,759,320 B2
(45) Date of Patent: Oct. 13, 2026

(54) PRINTER, FOOD PRODUCT SCALE AND ASSOCIATED PRINTER ROLLER MOUNTING SYSTEM

(71) Applicant: ILLINOIS TOOL WORKS INC., Glenview, IL (US)

(72) Inventors: Robert Andrew Holmes, Worcester (GB); Austin Knoblauch, Centerville, OH (US); Randall L. Redman, Beavercreek, OH (US); Ian D. Taylor, Warwickshire (GB)

(73) Assignee: ILLINOIS TOOL WORKS INC., Glenview, IL (US)

( * ) Notice: Subject to any disclaimer, the term of this patent is extended or adjusted under 35 U.S.C. 154(b) by 118 days.

(21) Appl. No.: 18/756,789

(22) Filed: Jun. 27, 2024

(65) Prior Publication Data

US 2026/0001357 A1 Jan. 1, 2026

(51) Int. Cl.

| | |
|---|---|
| ***B41J 13/02*** | (2006.01) |
| ***B41J 13/03*** | (2006.01) |
| ***B41J 13/076*** | (2006.01) |
| *G01G 19/40* | (2006.01) |

(52) U.S. Cl.

CPC ............. *B41J 13/03* (2013.01); *B41J 13/076* (2013.01); *G01G 19/40* (2013.01)

(58) Field of Classification Search

CPC ... B41J 3/4075; B41J 3/36; B41J 13/02; B41J 13/03; B41J 13/076

See application file for complete search history.

(56) References Cited

U.S. PATENT DOCUMENTS

| | | | | |
|---|---|---|---|---|
| 8,517,618 | B2 | 8/2013 | Cartwright | |
| 2007/0286659 | A1* | 12/2007 | Yamada | B41J 2/325 400/58 |
| 2017/0144456 | A1 | 5/2017 | Takahashi et al. | |
| 2017/0173979 | A1 | 6/2017 | Hoshi et al. | |
| 2017/0210154 | A1 | 7/2017 | Chiba et al. | |
| 2020/0130383 | A1* | 4/2020 | Takeda | B41J 29/13 |
| 2022/0080755 | A1* | 3/2022 | Hirsch | B41J 3/4075 |
| 2023/0347669 | A1 | 11/2023 | Hwang et al. | |
| 2024/0190147 | A1 | 6/2024 | Mun Hon et al. | |
| 2025/0206048 | A1* | 6/2025 | Maynard | B41J 25/3082 |

FOREIGN PATENT DOCUMENTS

KR 20130094543 A 8/2013

OTHER PUBLICATIONS

Avery Berkel, XTi/XTs Series Service Instructions Manual, ABR35-000660-AG, Aug. 24, 2022, 95 pages.

* cited by examiner

*Primary Examiner* — Scott A Richmond

(74) *Attorney, Agent, or Firm* — THOMPSON HINE LLP

(57) ABSTRACT

A printer includes a media path along which a media is movable, and a printhead assembly positioned along the media path at a first side of the media path. A print roller is positioned along the media path at a second side of the media path such that media passes between the printhead assembly and the print roller. The print roller is mounted to a support assembly that is configured to permit tool-free removal of the print roller for cleaning or replacement.

19 Claims, 10 Drawing Sheets

PRINTER, FOOD PRODUCT SCALE AND ASSOCIATED PRINTER ROLLER MOUNTING SYSTEM

TECHNICAL FIELD

This application relates generally to scales used for weighing food product in supermarkets, groceries and other stores and printing labels, and, more particularly, to a scale type printer including a user friendly print roller mounting system.

BACKGROUND

In typical commercial food product scale applications the scale is used to weigh food products and determines prices for the food products, and an associated printer prints a label for application to the food product. An operator enters a product number, such as a PLU (price look-up) number, for the product being weighed and the scale accesses its database, or accesses a remote database, for pricing information on the product. The total price for the item is then determined based upon its weight. Price can also be determined based upon item count. In either case, the food product scale typically prints a label with the price and other information for the product.

Scales with printhead assemblies that have a printhead that is biased toward a print roller are known. The print roller is a wear part that require occasional replacement. In addition, different customers may use different label stock types, such as liner-based and linerless, and different print roller configurations are needed for the different stocks. Label printers that are not formed as scales include similar issues. As used herein, the term printer encompasses both devices that function solely or primarily as printers, as well as other devices that include a printer function but also include other functions in addition to printing, such as a weighing scale that also prints labels.

It would be desirable to provide a scale (or other printer) with a more effective and user-friendly arrangement for dealing with print roller replacement as needed in the case of wear and/or the ability to readily switch between a liner-based label stock setup and a linerless label stock setup.

SUMMARY

In one aspect, a printer includes a media path along which a media is movable, and a printhead assembly positioned along the media path at a first side of the media path. A print roller is positioned along the media path at a second side of the media path such that media passes between the printhead assembly and the print roller. The print roller is mounted to a support assembly that is configured to permit tool-free removal of the print roller for cleaning or replacement.

In another aspect, a printer includes a printer body, a media path along which a media is movable and a printhead assembly positioned along the media path at a first side of the media path. A print roller is positioned along the media path at a second side of the media path such that media passes between the printhead assembly and the print roller. A support assembly supports the print roller, wherein the support assembly comprises a primary support base that is fixed to the printer body, and a secondary support base that is releasably retained to the primary support base, wherein the print roller is seated on the secondary support base.

The details of one or more embodiments are set forth in the accompanying drawings and the description below. Other features, objects, and advantages will be apparent from the description and drawings, and from the claims.

DETAILED DESCRIPTION

Figure 1:
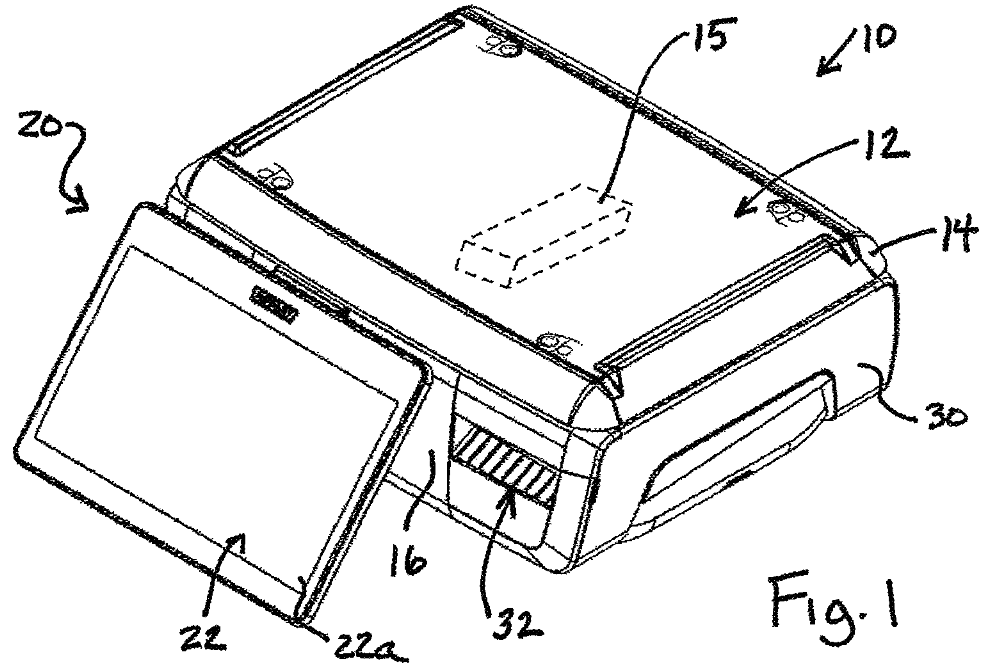
FIGS. 1 and 2 show perspective views of a scale.
Figure 2:
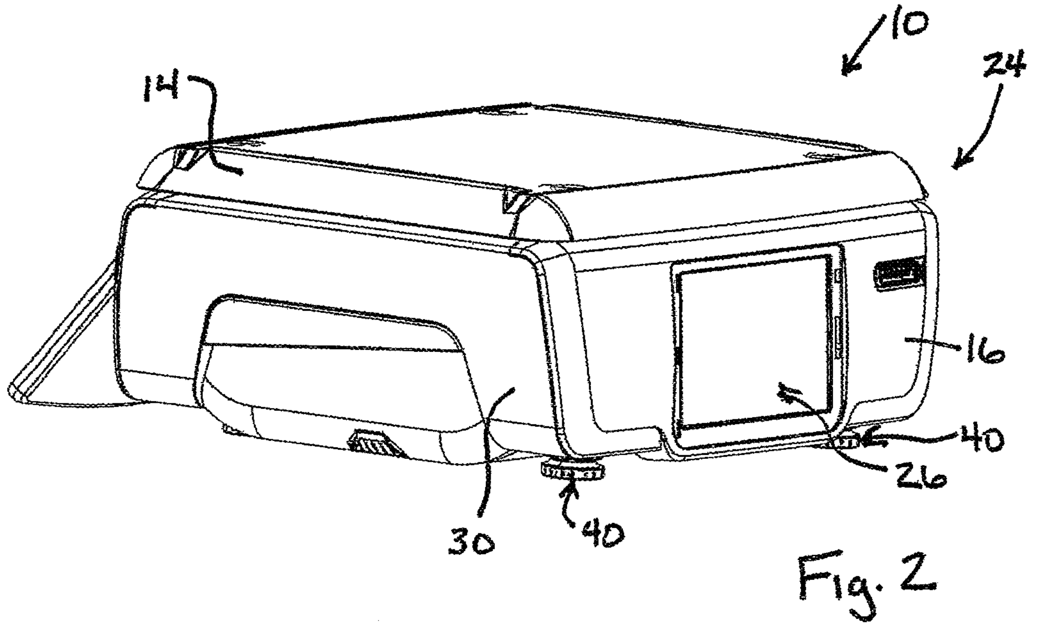
Figure 3:
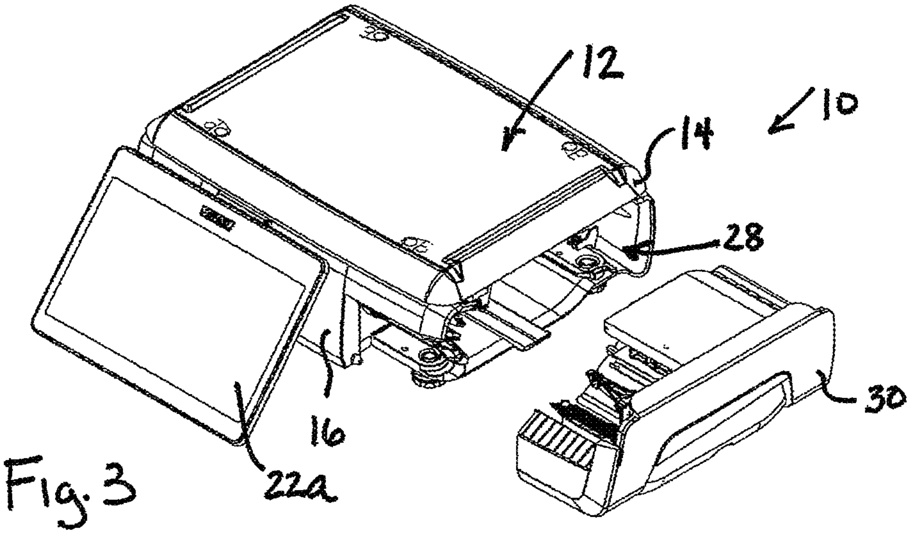
FIG. 3 shows a perspective view with label cassette removed.
Figure 4:
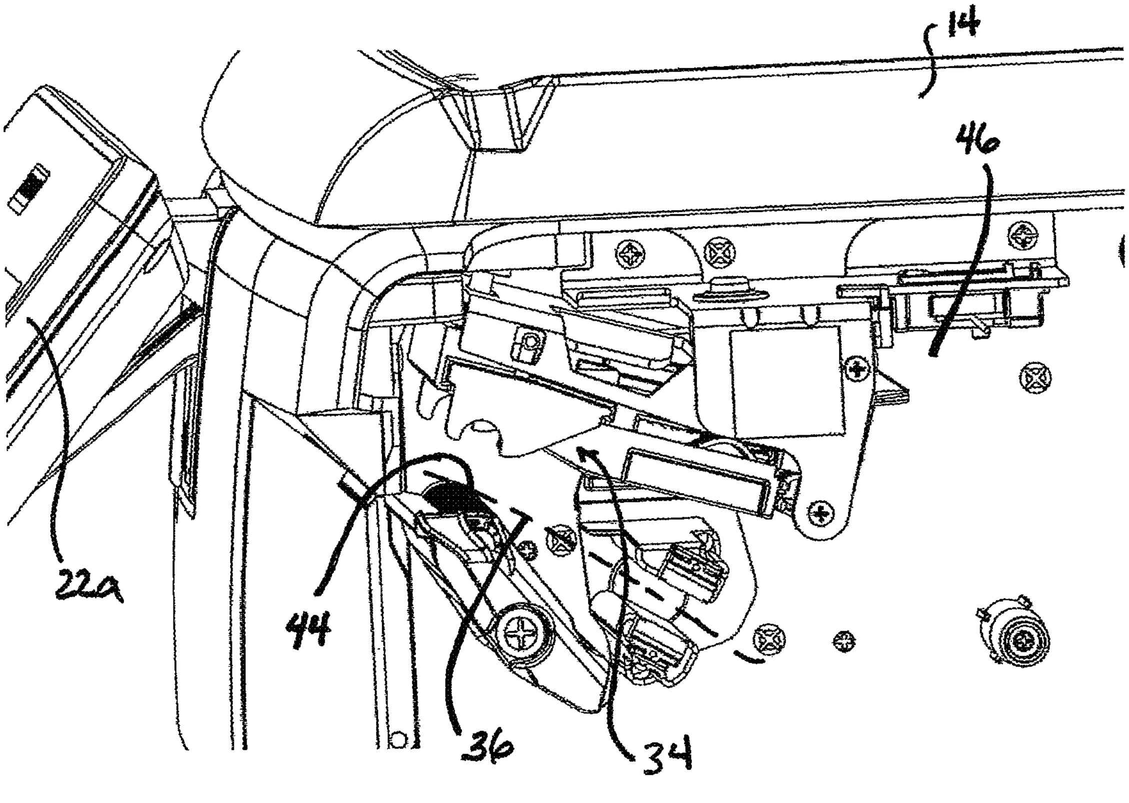
FIG. 4 shows a partial perspective of a printhead/print roller region within the cassette receiving station.
Figure 5:
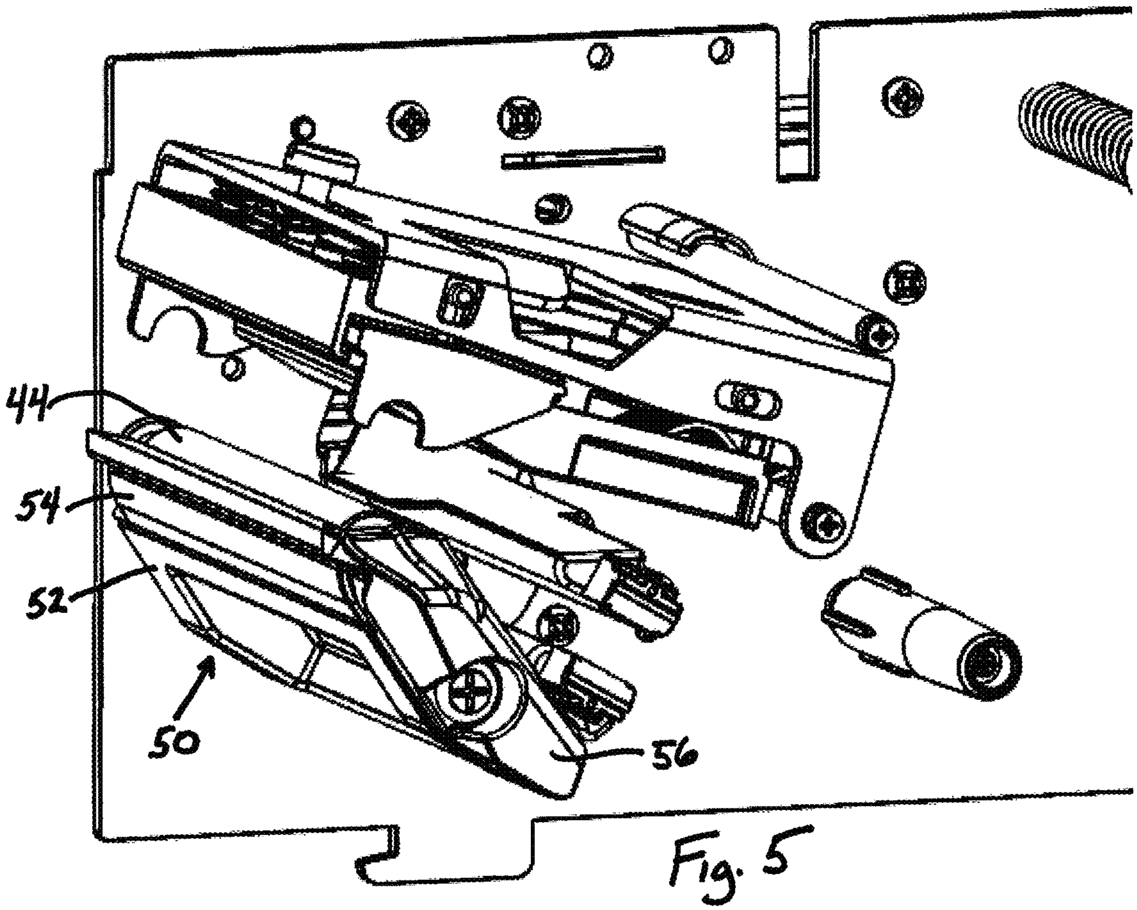
FIGS. 5-6 show perspective views of the printhead/print roller region.
Figure 6:
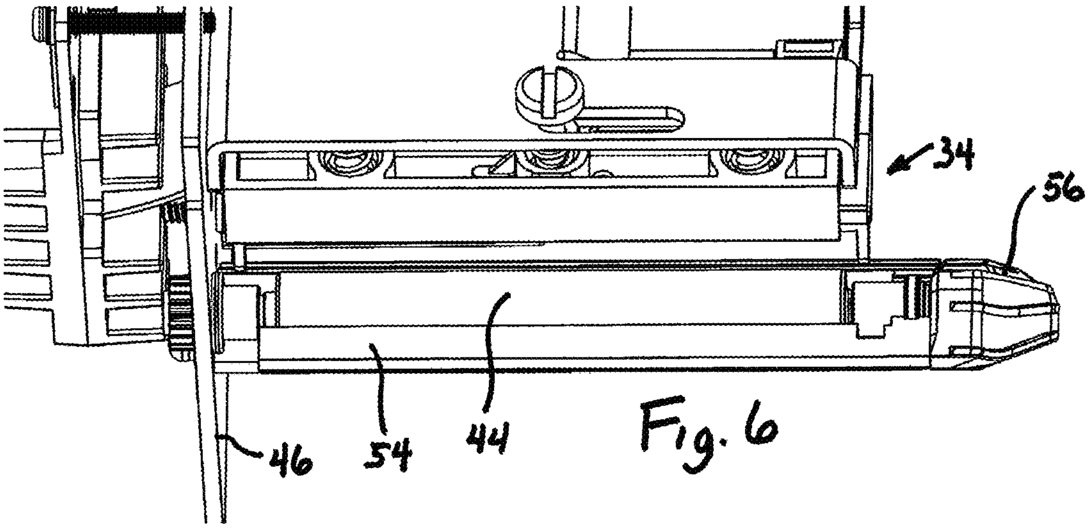
Figure 7:
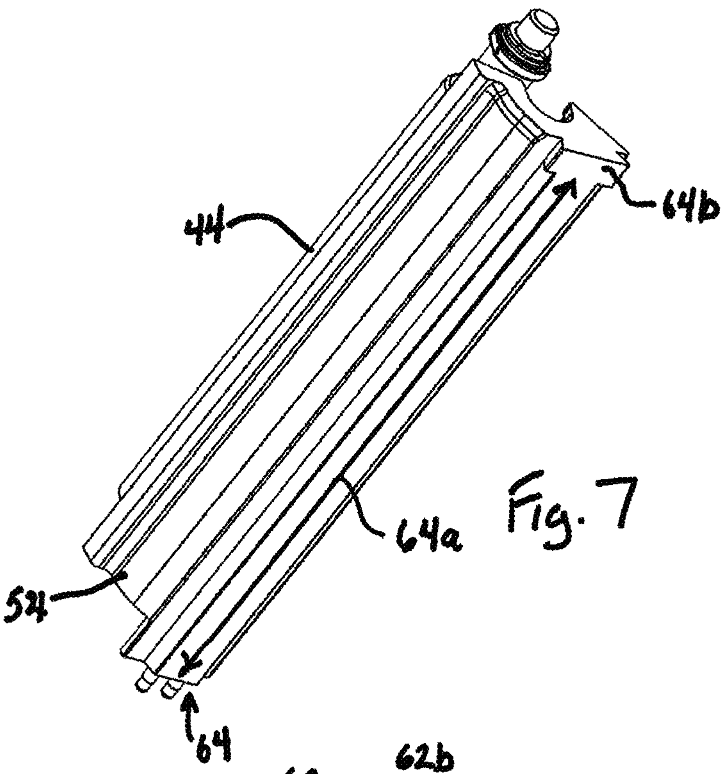
FIG. 7 shows a perspective view of a print roller and secondary support base.
Figure 8:
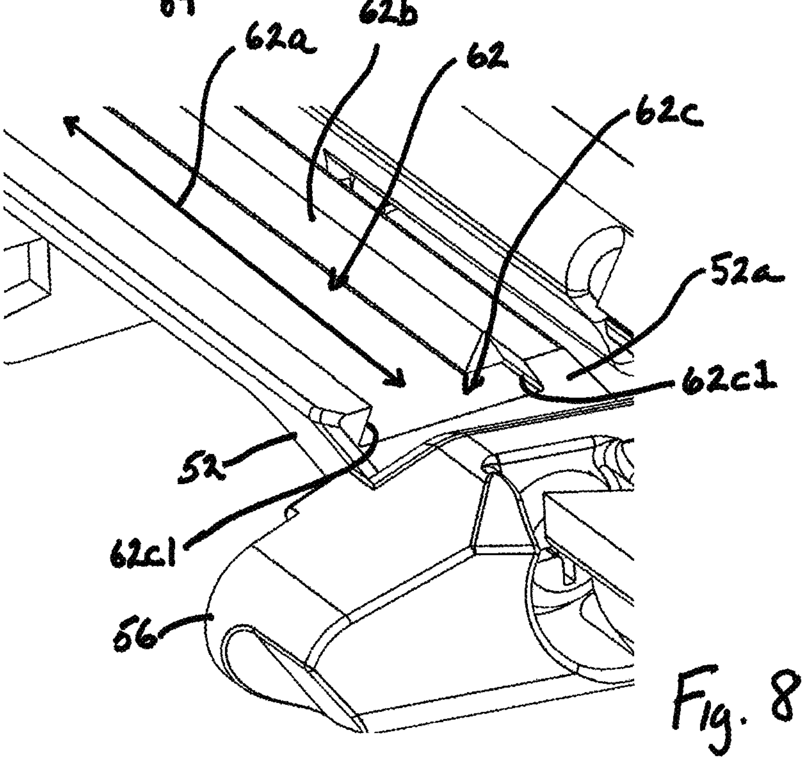
FIG. 8 shows a perspective view of the primary support base.
Figure 9:
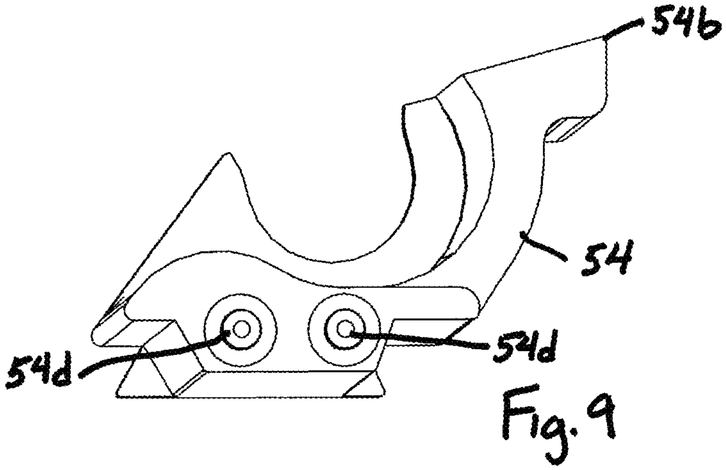
FIGS. 9-10 show perspective views of the secondary support base.
Figure 10:
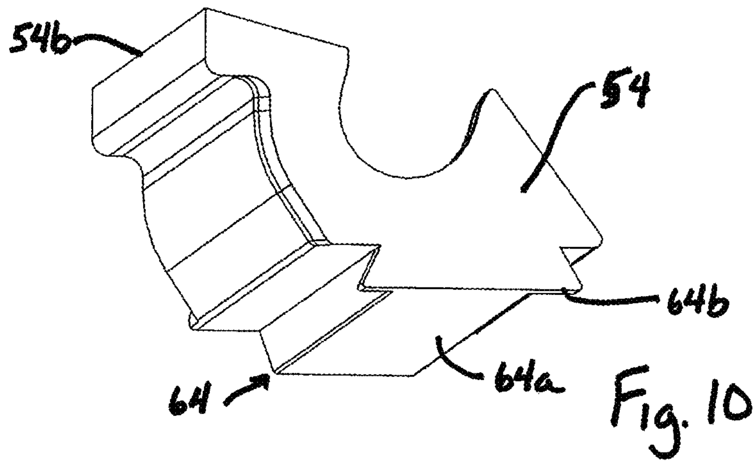
Figure 11:
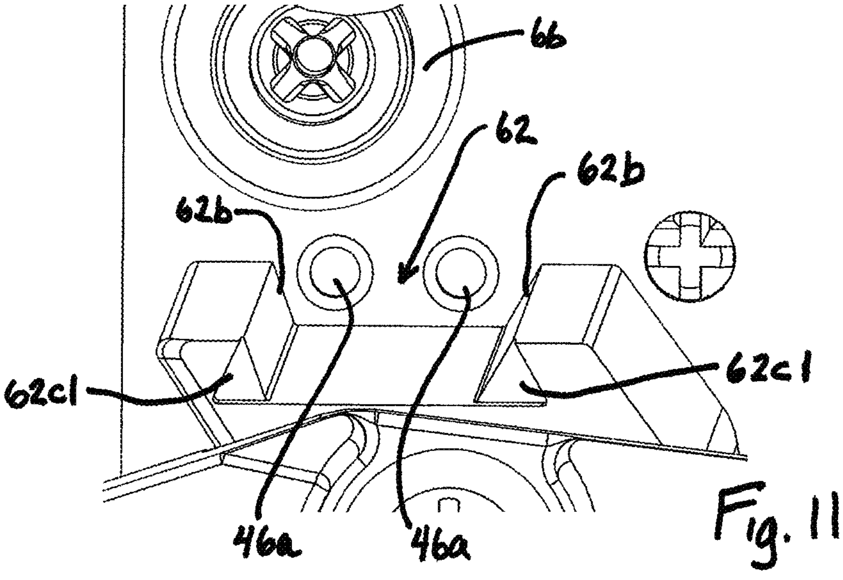
FIG. 11 shows a perspective view of the primary support base.
Figure 12A:
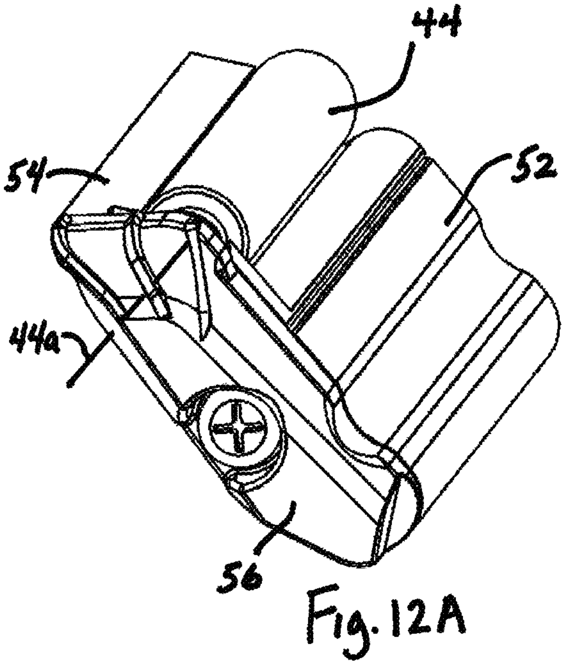
FIGS. 12A-12B show a print roller support assembly with end cap in print roller retention position.
Figure 12B:
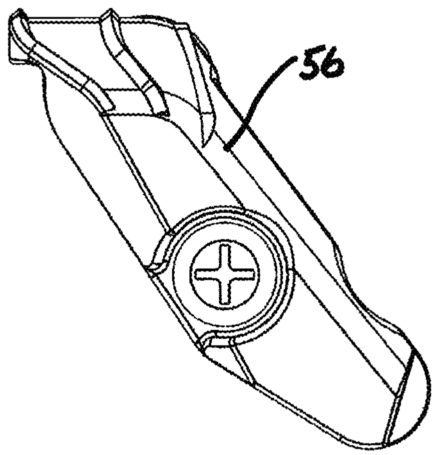

Referring to FIGS. 1-23, an exemplary scale configuration is shown. The scale 10 includes a weighing station 12, which in some embodiments may be formed by a weighing platter 14 that can be removed (e.g., for cleaning) from atop the scale body 16. A platter support bracket (not shown) transfers forces to a mechanism, such as a load cell 15 located internal of the scale body 16, for producing weight indicative signals when items are placed on the weighing station. An operator interface side 20 of the scale includes an operator interface 22 configured to display information associated with scale operations. By way of example, the operator interface 22 may be formed by a touch-screen display 22*a*. A customer interface side 24 of the scale includes a customer interface 26, which in certain embodiments may be formed by any suitable display screen technology.

A side portion of the scale body incudes a cassette station 28 that receives a removable label stock cassette 30 that defines a label exit slot 32. A printhead assembly 34 is located within the scale body along a label stock path 36 and may use any suitable printing technology for printing on labels of a label supply roll loaded in the cassette 30, which printed labels then exit the label exit slot 32 to be applied to products. For example, the printhead assembly may carry a thermal printhead for printing on thermal label stock.

The printhead assembly 34 is pivotably mounted to a wall 38 of the scale body by a support bracket 40 which is capable of rotation about an axis 42. The printhead assembly pivots toward a print roller 44 when the cassette is loaded into the cassette station, placing the label stock between the printhead assembly 34 and the print roller 44 for the purpose of printing. Here, the printhead assembly 34 is located at an upper side of the label stock path 36 and the print roller 44 is located at a lower side of the label stock path 36.

The scale body 16 includes a wall 46 (e.g., a metal plate) at the internal side of the cassette station 28 and to which the print head assembly 34 is mounted. A support assembly 50 for the printer roller 44 includes a primary support base 52 (e.g., in the form of a metal casting) that is fixed to the wall 46. A secondary support base 54 (e.g., in the form of a metal casting) is releasably retained to the primary support base 52, and the print roller 44 is seated on the secondary support base 52. The secondary support base 54 and primary support base 52 are configured with corresponding mating shapes and features to facilitate this releasable retention.

In particular, the primary support base 52 defines an axial mating segment 62 and the secondary support base 54 defines an axial mating segment 64 that matingly engages with the axial mating segment 62. Here, the axial mating segment 62 includes a slot portion 62*a* that has outward and upwardly extending wall portions 62*b* such that the slot portion 62*a* is not undercut. The axial mating segment 62 also include a slot portion 62*c* that is includes undercuts 62*c*1 (here resulting from a dovetail shape). Similarly, the axial mating segment 64 includes a rail portion 64*a* that is shaped to sit vertically down into the slot portion 62*a* and a rail portion 64*b* (here with a mating dovetail shape) that can only engage with the slot portion 62*c* by axially slidingly engaging into the slot portion 62*c*. With this configuration, by axially sliding the rail portion 64*b* out of the slot portion 62*c*, the secondary support base 54 can be separated from the primary support base 52 by a simple vertically upward movement of the secondary support base 54 to move the rail portion 64*a* out of the slot portion 62*a*, which eliminates the need to axially slide the secondary support base 54 away from the primary support base by its full length. This configuration is also useful when the secondary support base is being reinstalled, because the mating shapes of the rail portion 64*a* and the slot portion 62*a* help properly align the rail portion 64*b* for sliding engagement into the slot portion 62*c*.

Figure 13A:
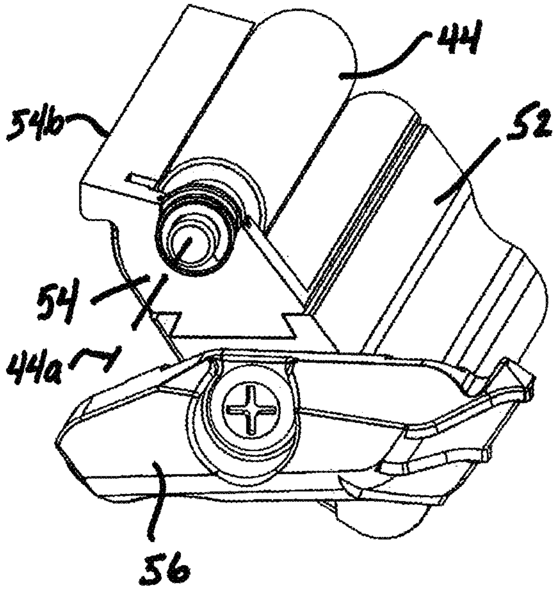
FIGS. 13A-13B show the print roller support assembly with end cap in print roller release position.
Figure 13B:
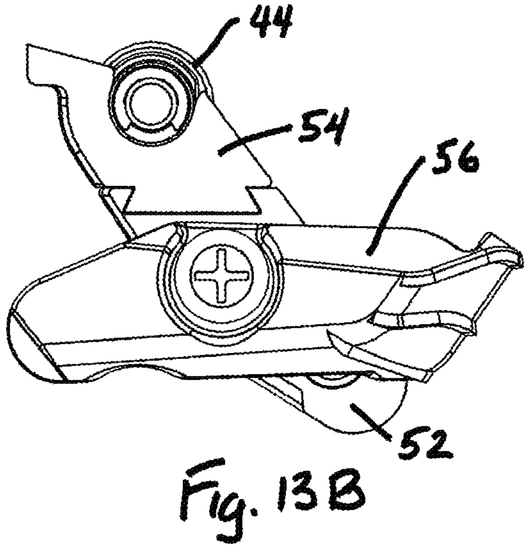
Figure 14:
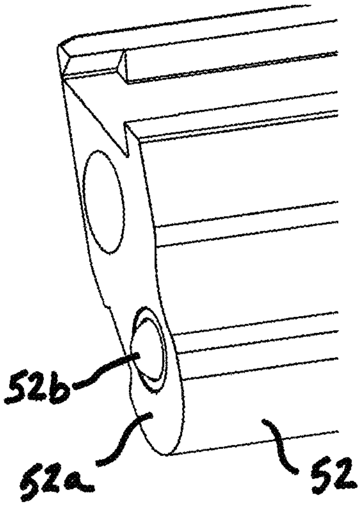
FIG. 14 shows a perspective view of a free end portion of the primary support base.
Figure 15:
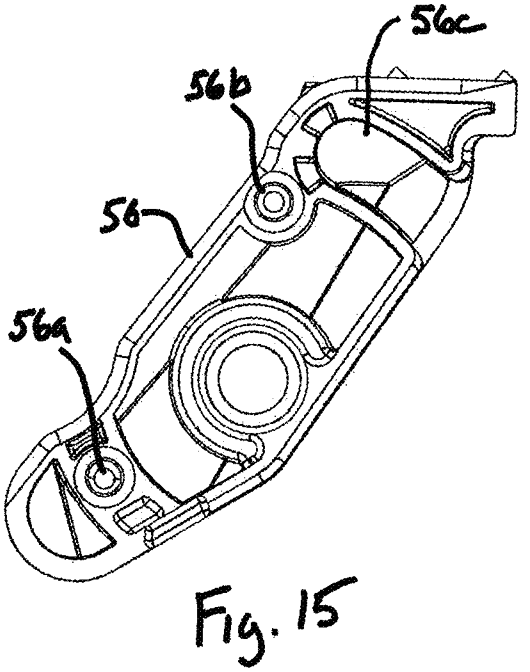
FIGS. 15-16 show views of the inward facing side of the end cap.
Figure 16:
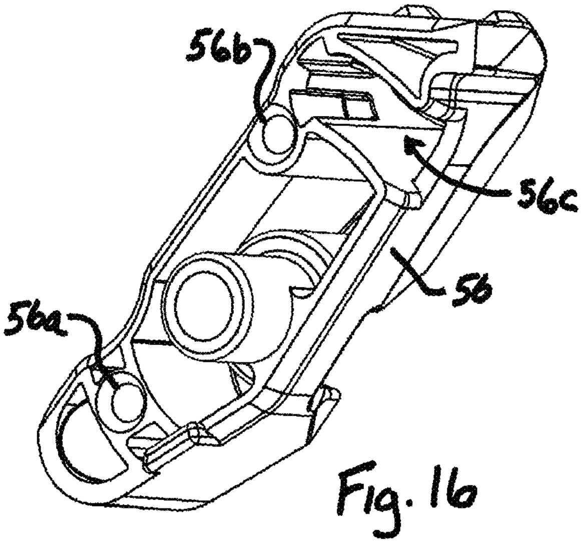
Figure 17:
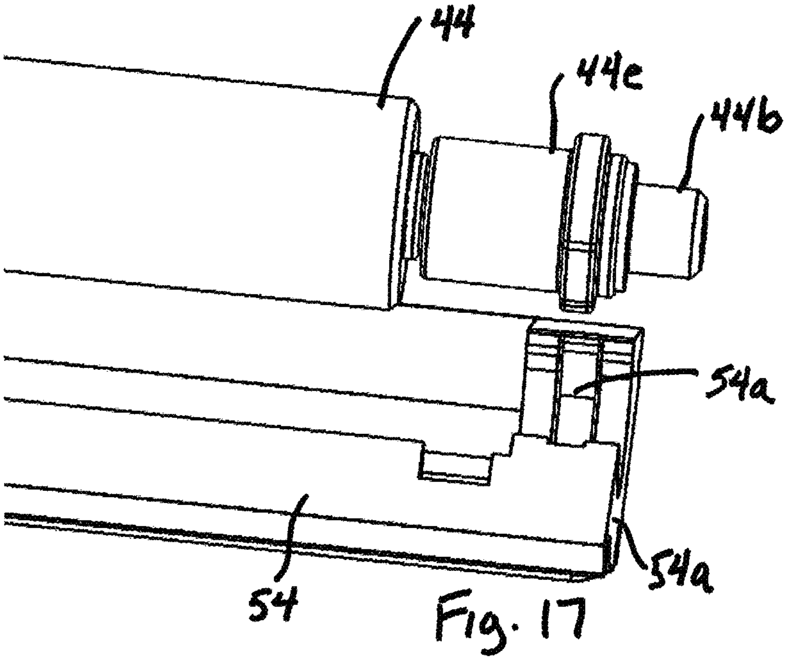
FIG. 17 shows the outward end of the print roller and secondary support base.
Figure 18:
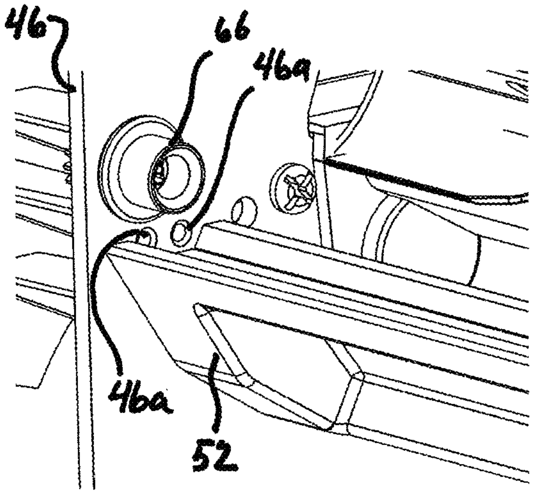
FIG. 18 shows a perspective view of the inward end of the primary support base.
Figure 19:
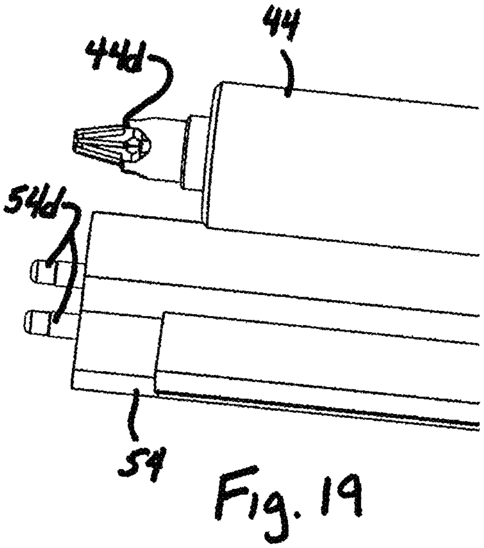
FIG. 19 shows the inward end of the print roller and secondary support base.
Figure 20:
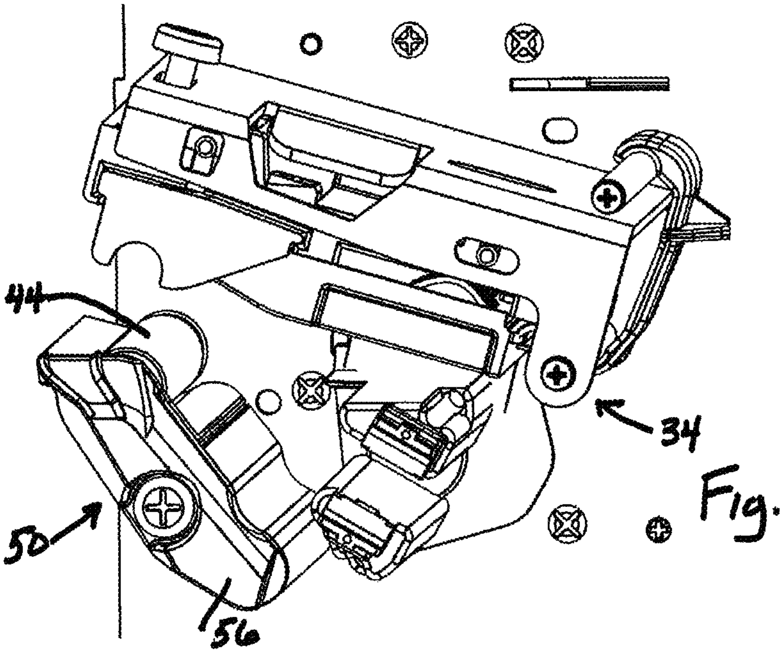
FIGS. 20-23 are perspective views showing a sequence of print roller removal.
Figure 21:
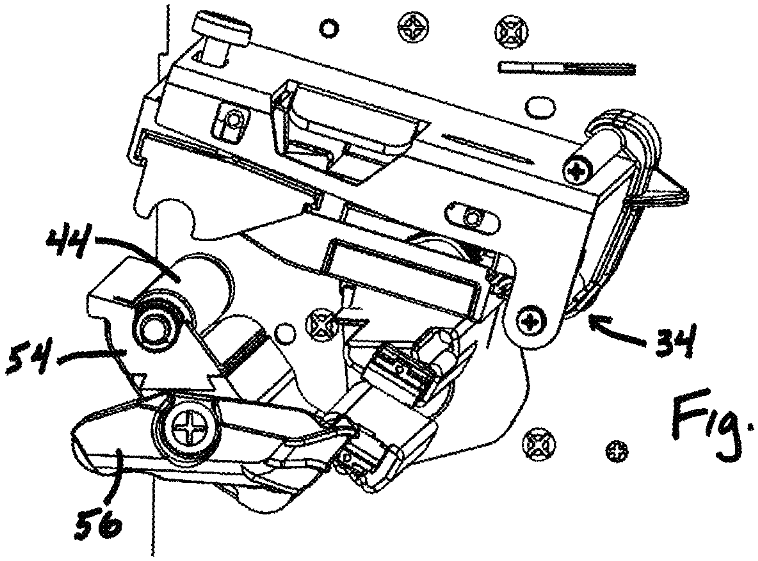
Figure 22:
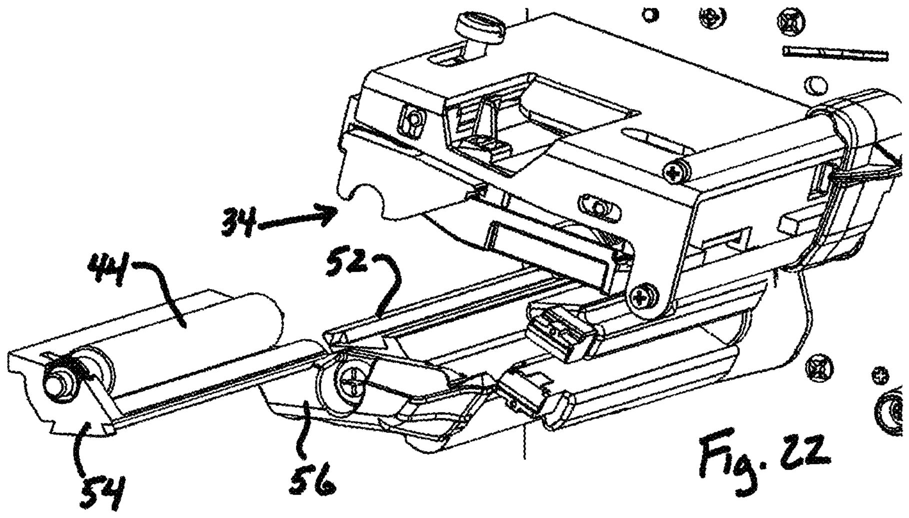

For the purpose of holding the secondary support base 54 in the installed position on the secondary support base 52, the primary support base includes a free end 52*a* with a cap member or end cap 56 rotatably or otherwise movably mounted thereon for movement between a retention position/roller retention position (e.g., FIGS. 12A-12B) and a release position/roller release position (e.g., FIGS. 13A-13B). Notably, the cap member 56 axially overlies both part of the secondary support base 54 and part the print roller 44 when in the retention position, preventing the secondary support base 54 from sliding axially way from the primary support base 52. However, the cap member 56 does not axially overly any part of the secondary support base 54 or any part of the print roller 44 when in the release position. Therefore, the release position of the cap member 56 enables removal of both the secondary support base 54 and the print roller 44 for replacement and/or cleaning. Thus, the print roller support assembly 50 is configured to permit tool-free removal of the print roller 44 for cleaning or replacement, as well as tool-free removal of the secondary support base 54.

The free end 52*a* and the end cap 56 have corresponding mating detent features for releasably retaining the end cap in either the retention position or the release position. Here, the free end 52*a* include an outwardly biased ball detent 52*b*, and the cap member includes inwardly facing detent recesses 56*a* and 56*b* that are engageable with the ball detent 52*b*. Detent recess 56*a* aligns and seats with the ball detent 52*b* when the cap member is in its retention position, and detent recess 56*b* aligns and seats with the ball detent 52*b* when the cap member is in its release position.

In the roller retention position, the end cap 56 overlies a rotation axis 44*a* of the print roller 44, but in the roller release position, the end cap 56 does not overlie the rotation axis 44*a*. The print roller 44 includes a shaft portion 44*b* that extends outward beyond the free end 52*a* of the primary support base 52 and the free end 54*a* of the secondary support base 54, and the end cap 56 includes a shaft capture recess 56*c*. When the end cap 56 is moved from the roller release position to the roller retention position, the capture recess 56*c* slides over the shaft portion 44*b* such that the shaft portion 44*c* is located within the shaft capture recess 56*c*. Conversely, when the end cap 56 is moved from the roller retention position to the roller release position, the shaft capture recess 56*c* slides off of the shaft portion 44*b* such that the shaft portion 44*b* is no longer located within the shaft capture recess 56*c*.

The secondary support base 54 includes an inner end with one or more locating pins 54*d* that engage into locating holes 46*a* in the wall 46 of the printer body. This provides an additional stabilizing and retention feature for the secondary support base. The inner end of the print roller shaft includes a protruding tapered gear member 44*d* that engages into a bushing 66 that has a mating drive gear part therewithin. The shaft of the print roller passes through a bearing 44*e* at the axially outward end, and the axially outward end of the secondary support base 54 includes a bearing capture recess segment 54*a* that captures at least part of the bearing 44*e* to inhibit or limit rotation of the bearing 44*e*.

Figure 23:
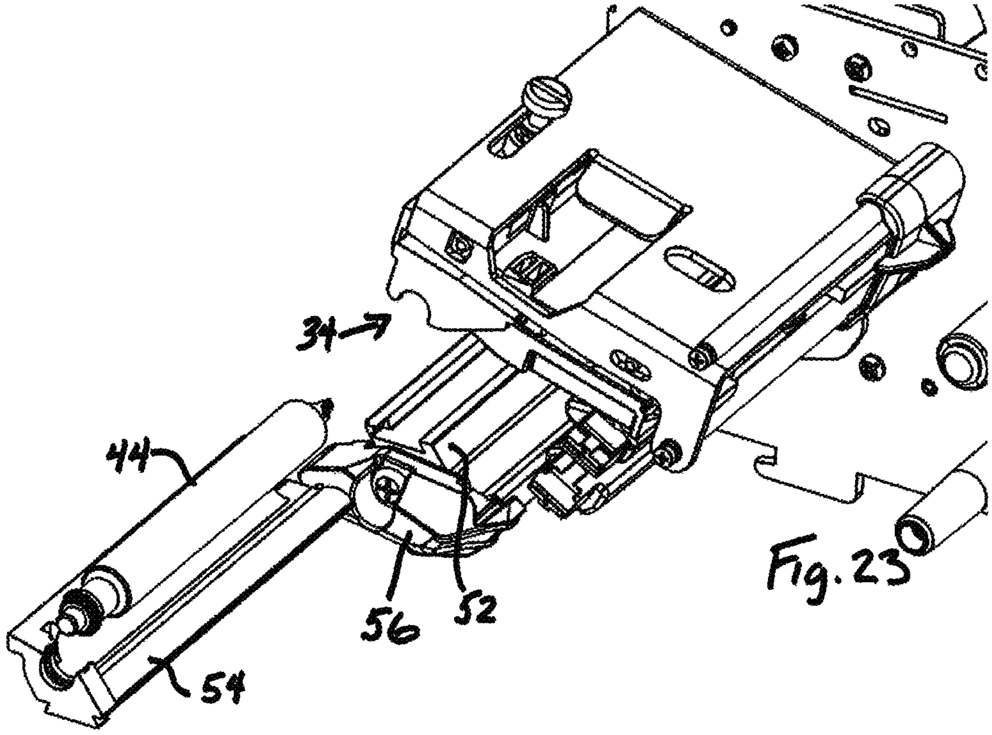

The described arrangement enables the print roller 44 and secondary support base 56 to be removed from the printer as a sub-assembly, without the use of any additional tools. In place of fasteners, the mechanism has a self-contained rotating end cap 56 which in one detent position captures the end of the print roller shaft locking it in place, and in the other detent position unlocks the secondary supporting base allowing it to be removed. When the print roller 44 and secondary support base 54 are removed, the print roller 44 can be removed from the secondary support base 54 (FIG. 23). At this time the print roller can be either replaced or cleaned to improve the operation of the printer. This configuration also allows for the end user to switch the standard print roller and secondary support base for a linerless version/setup, providing the flexibility of easy conversion from one setup to the other. A scale printer set up for liner-based labels uses a standard print roller and a support with peel bar or edge 54*b*, whereas a scale printer set up for linerless labels uses a special non-stick print roller and non-stick coated support to prevent the media from sticking and becoming jammed. The secondary support base used for the linerless setup can accommodate features such as ribbed ramps and slots for thin plastic guides which can be embedded into the print roller for preventing the label media from wrapping around the print roller. This mechanism offers the end user the ability to clear a jam themselves and avoid the need for a service call and down time.

It is to be clearly understood that the above description is intended by way of illustration and example only, is not intended to be taken by way of limitation, and that other changes and modifications are possible. For example, while the above description focuses on a scale with a label printing function, the mechanism could be utilized on printers that do not have a weighing function, and could also be used in connection with media other than label stock.

The invention claimed is:

1. A printer, comprising:

a media path along which a media is movable;

a printhead assembly positioned along the media path at a first side of the media path;

a print roller positioned along the media path at a second side of the media path such that media passes between the printhead assembly and the print roller;

wherein the print roller is mounted to a support assembly that is configured to permit tool-free removal of the print roller for cleaning or replacement;

wherein the support assembly comprises a primary support base and an end cap, wherein the primary support base has a free end, wherein the end cap is mounted to the free end for movement between a roller retention position and a roller release position.

2. The printer of claim 1, wherein the free end and the end cap have corresponding detent features for releasably retaining the end cap in either the roller retention position or the roller release position.

3. The printer of claim 1, wherein, in the roller retention position, the end cap overlies a rotation axis of the print roller, wherein, in the roller release position, the end cap does not overlie the rotation axis.

4. The printer of claim 1, wherein the print roller includes a shaft portion that extends outward beyond the free end of the primary support base, wherein the end cap includes a shaft capture recess, wherein, in the roller retention position, the shaft portion is located within the shaft capture recess, wherein, in the roller release position, the shaft portion is not located within the shaft capture recess.

5. The printer of claim 1, wherein the support assembly comprises a secondary support base, wherein the print roller seats on the second support base, wherein the secondary support base is retained on the primary support base when the end cap is in the roller retention position, wherein the secondary support base is removable from the primary support base when the end cap is in the roller release position.

6. The printer of claim 5, wherein the primary support base includes a mount slot and the secondary support base includes a mount rail that slidingly mates with the mount slot to at least partly retain the secondary support base against movement relative to the primary support base.

7. The printer of claim 6, wherein, when the end cap is in the roller retention position, the end cap overlies at least part of the secondary support base to prevent axially outward sliding of the secondary support base relative to the primary support base.

8. The printer of claim 7, wherein the secondary support base includes an inner end with one or more locating pins that engage into locating holes in a printer body portion of the printer.

9. The printer of claim 5, wherein the print roller includes a shaft portion that passes through a bearing, wherein the secondary support base includes a bearing capture segment that captures at least part of the bearing to limit rotation of the bearing.

10. A printer, comprising:

a printer body;

a media path along which a media is movable;

a printhead assembly positioned along the media path at a first side of the media path;

a print roller positioned along the media path at a second side of the media path such that media passes between the printhead assembly and the print roller;

a support assembly supporting the print roller, wherein the support assembly comprises a primary support base that is fixed to the printer body, and a secondary support base that is releasably retained to the primary support base, wherein the print roller is seated on the secondary support base;

wherein the print roller has an axial length, wherein the secondary support base includes an axial length that extends along the axial length of the print roller such that the secondary support base spans an entirety of the axial length of the print roller.

11. The printer of claim 10, wherein the primary support base defines a first axial mating segment and the secondary support base defines a second axial mating segment that matingly engages with the first axial mating segment.

12. The printer of claim 11, wherein the first axial mating segment includes a first slot portion that is not undercut and a second slot portion that is undercut, wherein the second axial mating segment includes a first rail portion that sits in the first slot portion and a second rail portion that axially engages into the second slot portion.

13. The printer of claim 12, wherein, upon sliding the second rail portion out of the second slot portion, the secondary support base can be separated from the primary support base by a vertically upward movement of the secondary support base to move the first rail portion out of the first slot portion.

14. The printer of claim 10, wherein the primary support base includes a free end with a cap member movably mounted thereon for movement between a retention position and a release position, wherein the cap member axially overlies both part of the secondary support base and part the print roller when in the retention position, wherein the cap member does not axially overly any part of the secondary support base or any part of the print roller when in the release position.

15. The printer of claim 14, wherein the free end and the end cap have corresponding detent features for releasably retaining the end cap in either the retention position or the release position.

16. A printer, comprising:

a printer body;

a media path along which a media is movable;

a printhead assembly positioned along the media path at a first side of the media path;

a print roller positioned along the media path at a second side of the media path such that media passes between the printhead assembly and the print roller;

a support assembly supporting the print roller, wherein the support assembly comprises a primary support base that is fixed to the printer body, and a secondary support base that is releasably retained to the primary support base, wherein the print roller is seated on the secondary support base, wherein, upon removal of the secondary support base from the primary support base, the print roller is removable from the secondary support base.

17. The printer of claim 16, wherein the secondary support base includes a bearing receiving recess, wherein the print roller includes a shaft portion that passes through a bearing that seats in the bearing receiving recess, wherein the print roller, with attached bearing, is removable from the secondary support member by a movement of the bearing out of the bearing receiving recess.

18. The printer of claim 17, wherein the movement of the bearing is upwardly out of the bearing receiving recess.

19. The printer of claim 16, wherein the primary support base defines a first axial mating segment and the secondary support base defines a second axial mating segment that matingly engages with the first axial mating segment.

* * * * *